US011498394B2

(12) United States Patent
Doriott

(10) Patent No.: US 11,498,394 B2
(45) Date of Patent: Nov. 15, 2022

(54) SUN SHADE FOR OFF-ROAD VEHICLES

(71) Applicant: Jane Marie Doriott, East Bethel, MN (US)

(72) Inventor: Jane Marie Doriott, East Bethel, MN (US)

(*) Notice: Subject to any disclaimer, the term of this patent is extended or adjusted under 35 U.S.C. 154(b) by 165 days.

(21) Appl. No.: 16/864,426

(22) Filed: May 1, 2020

(65) Prior Publication Data

US 2020/0346528 A1 Nov. 5, 2020

Related U.S. Application Data

(60) Provisional application No. 62/842,093, filed on May 2, 2019.

(51) Int. Cl.

*B60J 3/02* (2006.01)
*B62D 65/16* (2006.01)
*B60J 3/00* (2006.01)

(52) U.S. Cl.

CPC ........... *B60J 3/0213* (2013.01); *B62D 65/16* (2013.01); *B60J 3/002* (2013.01)

(58) Field of Classification Search

CPC ......... B60J 3/002; B60J 3/0286; B60J 3/0213
See application file for complete search history.

(56) References Cited

U.S. PATENT DOCUMENTS 5,772,272 A * 6/1998 Faddis ..................... B60R 7/05 296/97.5
D413,148 S * 8/1999 Ferguson ....................... D20/40
2011/0303371 A1* 12/2011 Harrison ................ B60J 1/2011 160/370.21

FOREIGN PATENT DOCUMENTS

JP 2017209424 * 11/2017

* cited by examiner

*Primary Examiner* — Joseph D. Pape

(57) ABSTRACT

A sun shade that can be used as a sun blocker for off-road vehicles such as UTVs, ATVs, golf carts, and tractors is disclosed herein. The sun shade is a length of elastic fabric that stretches between two front side bars of an off-road vehicle and attaches to itself via fasteners for quick and easy installation without the need for any tools. The sun shade can block out sun glare, thereby improving vision.

18 Claims, 4 Drawing Sheets

20
140
20

130
120

SUN SHADE FOR OFF-ROAD VEHICLES

CROSS-REFERENCE TO RELATED APPLICATIONS

This application is a non-provisional and claims benefit of U.S. Provisional Application No. 62/842,093, filed May 2, 2019, the specification of which is incorporated herein in its entirety by reference.

FIELD OF THE INVENTION

The present invention relates to a sun shade for off-road vehicles to improve vision.

BACKGROUND OF THE INVENTION

Off-road vehicles can be used for utility and recreational purposes. Examples of off-road vehicles include utility terrain vehicles (UTVs) or side-by-side, all-terrain vehicles (ATVs), golf carts, and tractors. When operating an off-road vehicle, the driver (and passengers) may suddenly find himself or herself blinded by the sun. This can occur when travelling in the direction of the sun, particularly during sunrise or sunset. An immediate reaction would be to hold one's hand between the eyes and the sun to block out the glare. However, this is not a safe driving condition since the driver would be using one hand for steering and the other hand to shield the eyes. Hence, there exists a need to shield the driver and passengers from the sun's glare.

BRIEF SUMMARY OF THE INVENTION

It is an objective of the present invention to provide systems and methods that improve vision and safety in an off-road vehicle, as specified in the independent claims. Embodiments of the invention are given in the dependent claims. Embodiments of the present invention can be freely combined with each other if they are not mutually exclusive.

In some aspects, the present invention features a sun shade for an off-road vehicle to block out sun glare. The sun shade may comprise a shade member having a first end and a second end, at least one of a first fastening component disposed at each end of the shade member, and a plurality of second fastening components disposed along the shade member. The sun shade is configured to be attached to two front bars of the off-road vehicle and block a portion of a viewing space between the two front bars, thereby blocking out sun glare.

Non-limiting examples of fasteners that may be used in the sun shade include hook and loop, buttons, snaps, and ties. The sun shade is multi-positional and can be adjusted as needed to block the sun. Without wishing to limit the present invention, the sun shade can block out the blinding effects of morning, afternoon, or evening sun glare when driving the off-road vehicle, thereby improving vision and eliminating unsafe driving conditions.

In preferred embodiments, the sun shade is portable and compact with a self-contained storage band and storage pouch, thus requiring minimal storage space. For example, the sunshade can be rolled or folded for easy storage. The sunshade can also be stored in a pouch or bag.

In some embodiments, the sun shade may come in multiple sizes, multiple fabrics, and various colors. In one embodiment, the sun shade may have a width ranging from about 4" to about 12". In another embodiment, the sun shade may have a length ranging from about 40" to about 100". In other embodiments, the sun shade is made from elastic fabrics or vinyl. Preferably, the sun shade is non-transparent.

In some other embodiments, the sun shade may be used in an off-road vehicle that has a windshield or no windshield. Without wishing to limit the present invention, the sun shade can be used in an off-road vehicle to block out sun glare without concealing or hindering use of a rear-view mirror, thereby improving vision and safety conditions. Furthermore, the sun shade can be easily and quickly installed without using tools or modifying the off-road vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which.

DETAILED DESCRIPTION OF THE INVENTION

Figure 1:
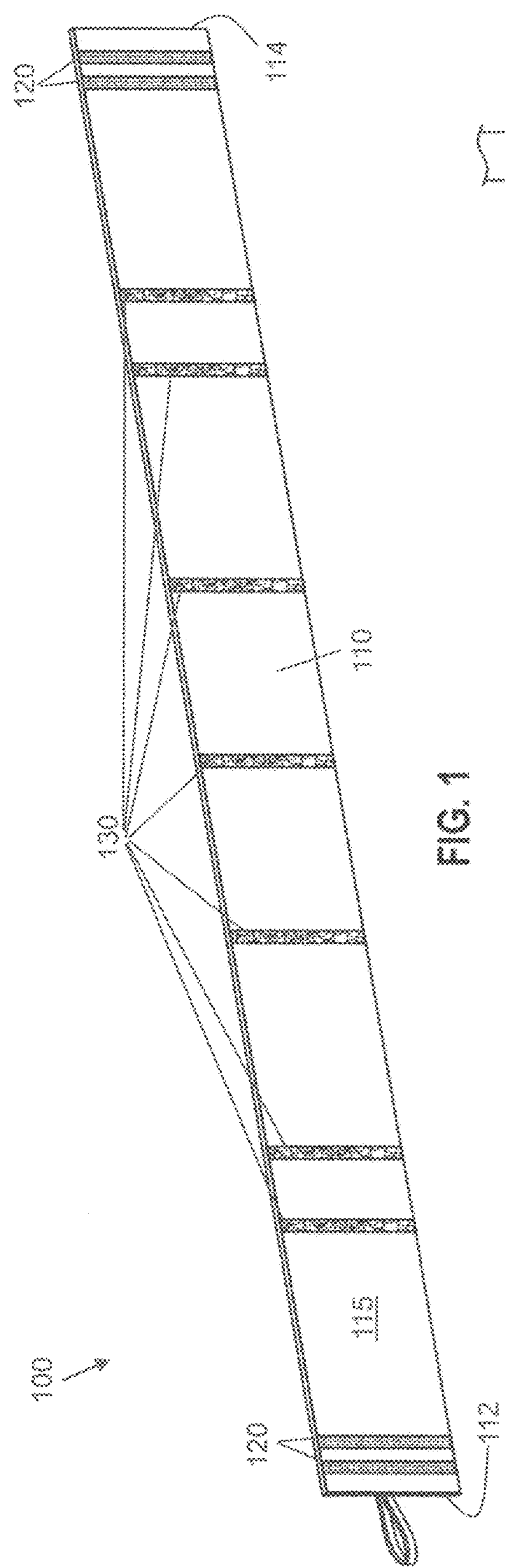
FIG. 1 shows an exemplary embodiment of a sun shade of the present invention.

Following is a list of elements corresponding to a particular element referred to herein:

10 off-road vehicle
15 viewing space
20 two front bars
100 sun shade
110 shade member
112 first end
114 second end
115 surface
120 first fastening component
130 second fastening component
140 loop band Off-road vehicles are known to one of ordinary skill in the art. All-terrain vehicles, also referred to as quads or 4-wheelers, typically have handle bars and saddle seating. Utility terrain vehicles (UTVs), also referred to as side-by-sides, differ from other off-road vehicles in that they have a steering wheel and pedals for controls and roll over protection. Golf carts are low speed vehicles typically used for transport while playing golf. Tractors are agricultural, low speed vehicles used for pulling various farming implements. Off-roads vehicles are not limited to these aforementioned examples.

Referring now to FIGS. 1-11, the present invention features a sun shade (100) for an off-road vehicle (10) to block out sun glare. In some embodiments, the sun shade (100) comprises an elongated, shade member (110) having a first end (112), a second end (114), and a surface (115) between said ends. At least one of a first fastening component (120) is disposed at each end of the shade member and a plurality of second fastening components (130) is disposed along the surface of the shade member.

Figure 2:
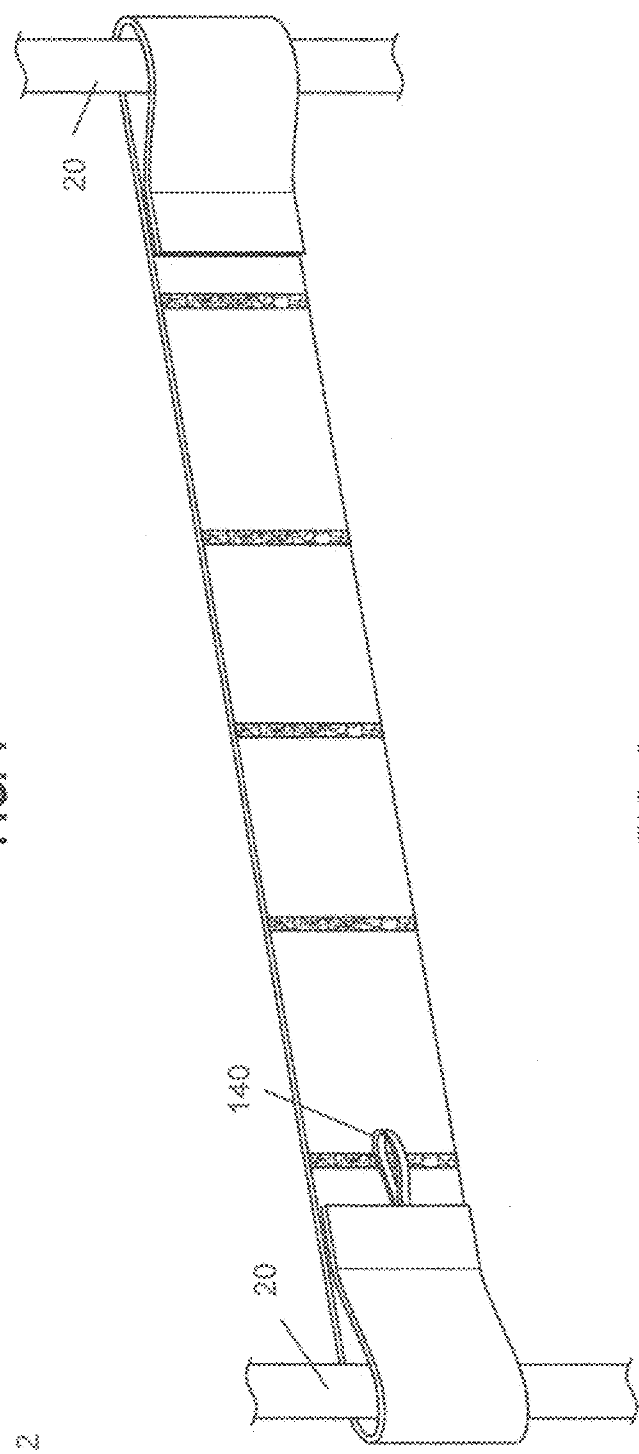
FIG. 2 shows the sun shade attached to roll-bars of an off-road vehicle.
Figure 8:
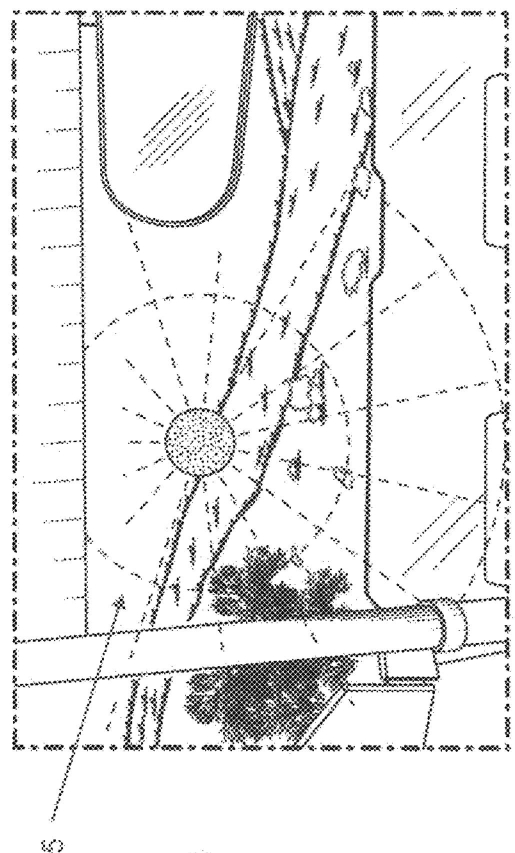
FIG. 8 demonstrates a blinding effect of the sun when looking out from a cabin of the side-by-side vehicle.
Figure 10:
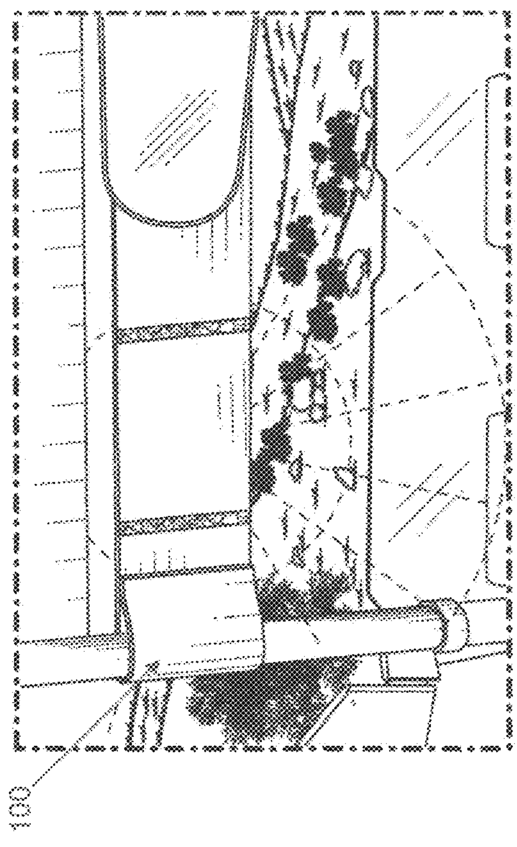
FIG. 10 demonstrates the sun shade blocking out the sun thereby averting the blinding effect and restoring vision when looking out from the cabin of the side-by-side vehicle.
Figure 7:
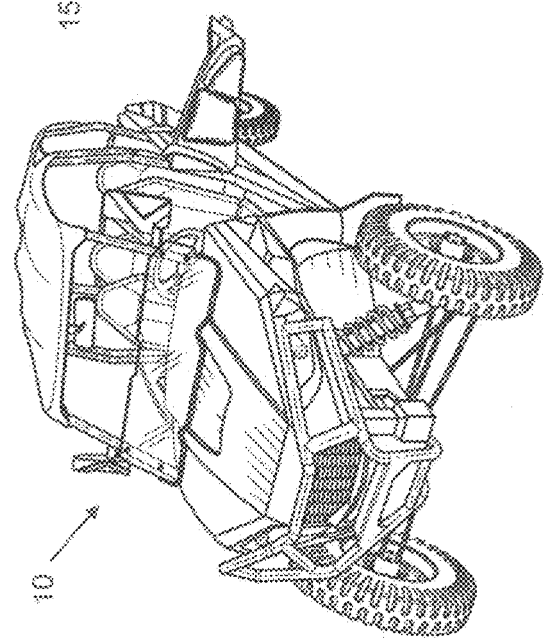
FIG. 7 shows a non-limiting embodiment of an off-road vehicle, in particular, a side-by-side vehicle.
Figure 9:
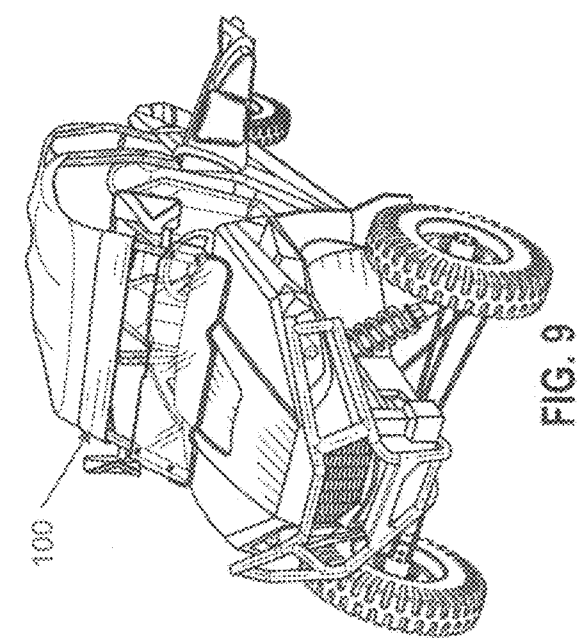
FIG. 9 shows the sun shade of the present invention attached to the roll cage bars of the side-by-side vehicle.

In some embodiments, as shown in FIG. 8, the off-road vehicle (10) has a viewing space (15) defined by two front bars (20) of the off-read vehicle. Referring to FIGS. 2 and 10, when the sun shade (100) is used in the off-road vehicle (10), the first end (112) of the shade member is wrapped around one of the front bars (20) and the at least one first fastening component (120) is attached to one of the second fastening components (130). The second end (114) of the shade member is wrapped around the other front bar (20) and the at least one first fastening component (120) is attached to one of the second fastening components (130). The shade member (110) blocks a portion of the viewing space between the two front bars, thereby blocking out sun glare.

The sun shade can be installed on any type of off-road vehicle having a first front bar at a driver side and a second front bar at a passenger side. As such, in other embodiments, the present invention features a method of blocking out sun glare in an off-road vehicle (10). The method may comprise providing any one of the sun shades described herein, wrapping the first end (112) of the shade member around the first front bar, fastening the at least one first fastening component (120) of the first end to one of the second fastening components (130), wrapping the second end (114) of the shade member around the second front bar, fastening the at least one first fastening component (120) of the second end to one of the second fastening components (130) such that the shade member (110) is sufficiently tight around the front bars and stays in place, wherein the shade member (110) blocks a portion of a viewing space between the two front bars, and sliding the sun shade (100) up or down the first and second bars such that the sun shade blocks sun glare.

As shown in FIGS. 3-6, the sun shade can span various widths between the two front bars. Preferably, the first fastening component (120) at the second end (114) of the shade member is fastened to the nearest second fastening component (130) that allows for the shade member (110) to be tightly wrapped around the front bars. For instance, the sun shade is stretched to have a sufficient tension so as to not slide down the bars. No tools are required to install the sun shade on the off-road vehicle. Moreover, the off-road vehicle does not need to be modified to use the sun shade of the present invention.

Without wishing to limit the present invention, the sun shade can be advantageously used in any off-road vehicle regardless of size. For example, the off-road vehicle (10) can be a utility terrain vehicle, an all-terrain vehicle, a golf cart, or a tractor. In some embodiments, the two front bars are part of a roll cage. In other embodiments, the two front bars are part of a canopy. Further still, the sun shade (100) can be attached to the front bars such that the sun shade (100) does not conceal a rear-view mirror of the off-road vehicle (10). As shown in FIG. 10, the sun shade (100) is positioned behind the rear-view mirror.

In some embodiments, the shade member (110) is comprised of an elastic material. The shade member (110) may comprise an elastic fabric, polyester, or vinyl.

Figure 11:
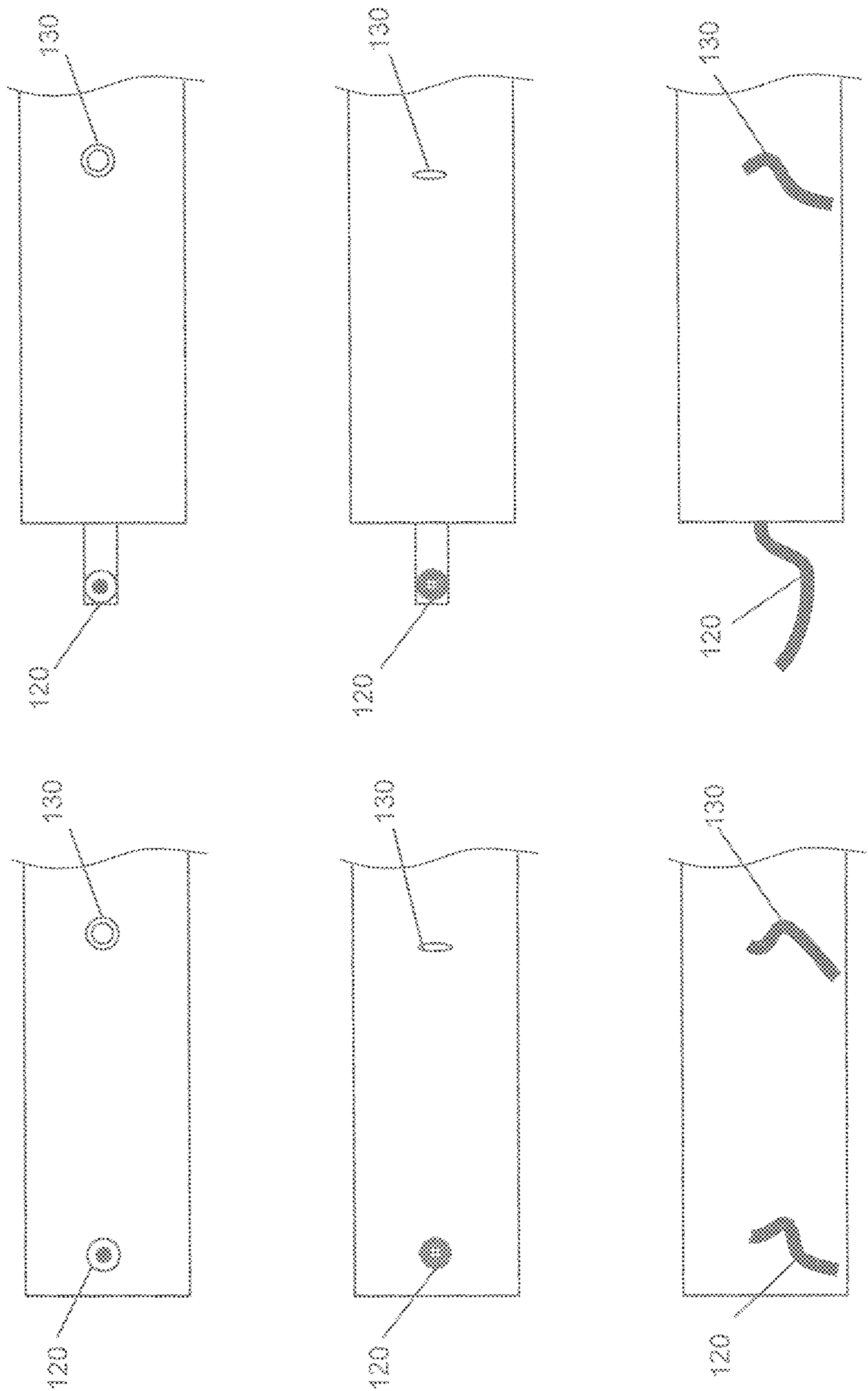
FIG. 11 shows different fasteners, and varying configurations thereof, that can be used with the sun shade. Snaps, buttons, and ties are shown from top to bottom, respectively.

In some embodiments, the first fastening component (120) and the second fastening components (130) comprise hook and loop fasteners. For example, as shown in FIG. 1, the hook and loop fasteners are strips traversing the width of the sun shade. Referring to FIG. 11, in other embodiments, the first fastening component (120) and the second fastening components (130) comprise snap fasteners or button and loop fasteners. In yet other embodiments, the first fastening component (120) and the second fastening components (130) comprise ties.

As shown in FIG. 11, in one embodiment, the first fastening component (120) is disposed on the surface (115) of the shade member. In another embodiment, the first fastening component (120) protrudes out from the ends of the shade member.

Figure 3:
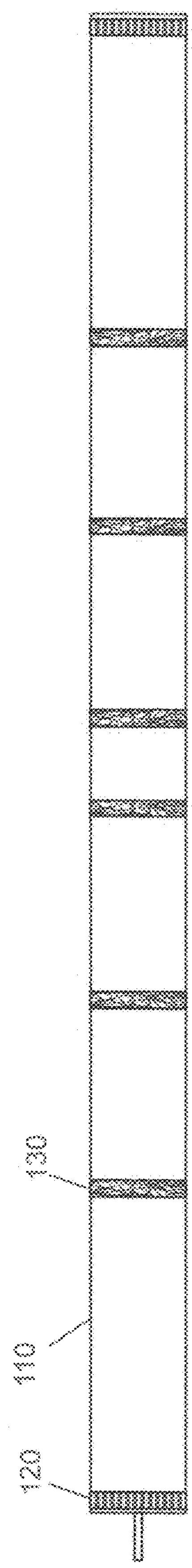
FIG. 3 shows another embodiment of the sun shade.
Figure 4:
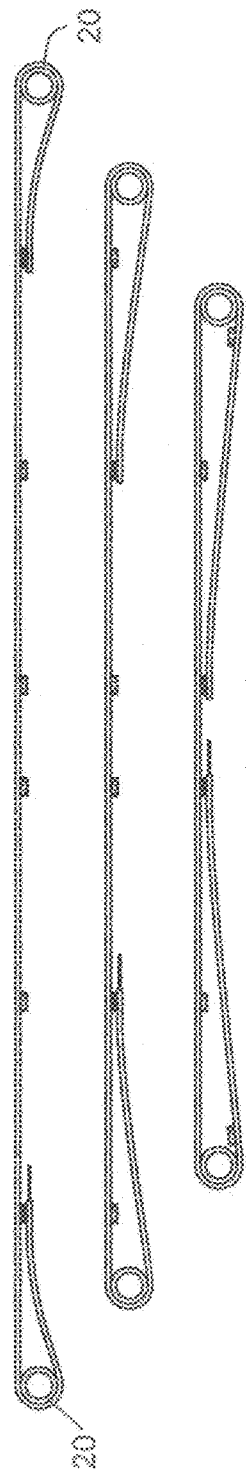
FIG. 4 shows top views of the sun shade in FIG. 3 attached to the roll-bars in varying positions.
Figure 5:
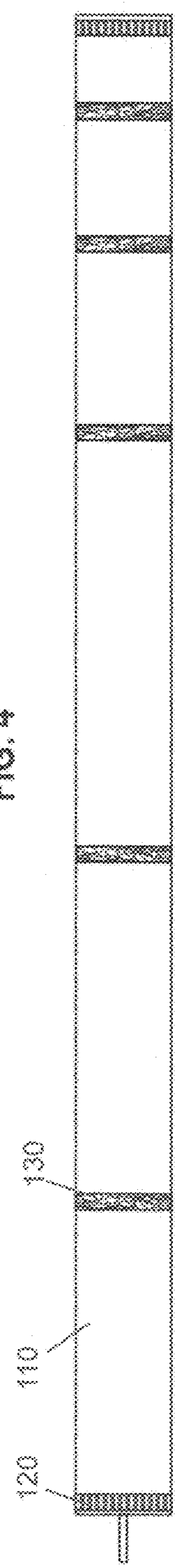
FIG. 5 shows another embodiment of the sun shade.
Figure 6:
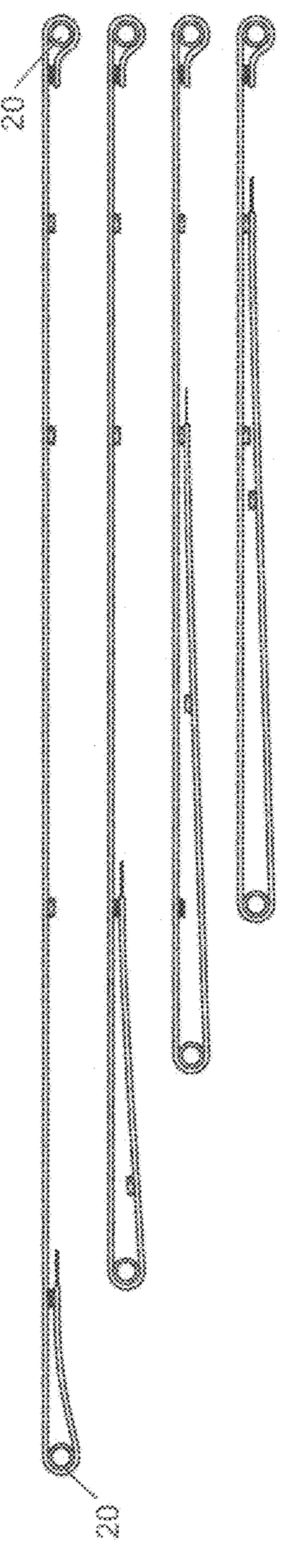
FIG. 6 shows top views of the sun shade in FIG. 5 attached to the roll-bars in varying positions.

In some embodiments, the sun shade may have one or two first fastening components (120) disposed at each end of the shade member. As shown in FIG. 1, the sun shade has two first fastening components (120) disposed at each end of the shade member. As shown in FIGS. 3 and 5, the sun shade has one first fastening component (120) disposed at each end of the shade member.

In other embodiments, the sun shade (100) may comprise 2-10 second fastening components (130) disposed on the surface of the shade member. For example, the sun shade (100) may have 5-7 second fastening components (130). The second fastening components (130) may be spaced evenly or unevenly along the length of the shade member.

In some embodiments, the shade member (110) is rectangular in shape. Preferably, the length of the shade member is greater than its width. In one embodiment, the shade member (110) may be about 4 inches to about 12 inches in width. In another embodiment, the shade member (110) may be about 40 inches to about 100 inches in length.

In further embodiments, the sun shade may have a loop band (140) attached to the first or second end of the shade member. The loop band can be used to secure the sun shade when it is rolled up or folded for storage. The loop band can also be used for pulling the shade member tightly around the second bar. In some other embodiments, the sun shade may include a bag or pouch for storage.

EXAMPLE

The following is a non-limiting example of installing the sun shade. It is to be understood that said example is not intended to limit the present invention in any way. Equivalents or substitutes are within the scope of the present invention.

Installation Instructions for the Sun Shade:

1. Remove sun shade from storage pouch.
2. Unwrap self-contained storage band and unroll the sun shade.
3. Position the sun shade such that the hook and loop fastener side is facing in towards the cab of vehicle.
4. Wrap one end of the sun shade around the outside of passenger roll bar and fasten the loop strip to the hook strip.

5. Wrap opposite end of the sun shade around the outside of driver roll bar, stretch the sun shade such that it is sufficiently tight enough to keep in place, and fasten the loop strip to the nearest hook strip.

6. Position by sliding the sun shade up or down the roll bars to a height that blocks the sun.

7. Adjust the sun shade as needed during use.

In some embodiments, the figures presented in this patent application are drawn to scale, including the angles, ratios of dimensions, etc. In some embodiments, the figures are representative only and the claims are not limited by the dimensions of the figures. Reference numbers recited in the below claims are solely for ease of examination of this patent application, and are exemplary, and are not intended in any way to limit the scope of the claims to the particular features having the corresponding reference numbers in the drawings.

In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A sun shade (100) for an off-road vehicle (10) to block out sun glare, said sun shade (100) comprising:

a) an elongated, shade member (110) having a first end (112), a second end (114), and a surface (115) between said ends, wherein the shade member (110) is comprised of an elastic material;

b) at least one of a first fastening component (120) disposed at each end of the shade member; and c) a plurality of second fastening components (130) disposed along the surface of the shade member;

wherein the off-road vehicle (10) has a viewing space (15) defined by two front bars (20) of the off-road vehicle, wherein when the sun shade (100) is used in the off-road vehicle (10), the first end (112) of the shade member is wrapped around one of the front bars (20) and the at least one first fastening component (120) is attached to one of the second fastening components (130), and the second end (114) of the shade member is wrapped around the other front bar (20) and the at least one first fastening component (120) is attached to one of the second fastening components (130), wherein the shade member (110) blocks a portion of the viewing space between the two front bars, thereby blocking out sun glare.

2. The sun shade (100) of claim 1, wherein the first fastening component (120) and the second fastening components (130) comprise hook and loop fasteners.

3. The sun shade (100) of claim 1, wherein the first fastening component (120) and the second fastening components (130) comprise button and loop fasteners.

4. The sun shade (100) of claim 1, wherein the first fastening component (120) and the second fastening components (130) comprise snap fasteners.

5. The sun shade (100) of claim 1, wherein the first fastening component (120) and the second fastening components (130) comprise ties.

6. The sun shade (100) of claim 1, wherein the first fastening component (120) is disposed on the surface (115) of the shade member.

7. The sun shade (100) of claim 1, wherein the first fastening component (120) protrudes out from the ends of the shade member.

8. The sun shade (100) of claim 1 comprising 1 or 2 first fastening components (120) disposed at each end of the shade member.

9. The sun shade (100) of claim 1 comprising 2 to 10 second fastening components (130) disposed on the surface of the shade member.

10. The sun shade (100) of claim 1, wherein the shade member (110) is rectangular.

11. The sun shade (100) of claim 1 further comprising a loop band (140) attached to the first or second end of the shade member.

12. The sun shade (100) of claim 1, wherein the shade member (110) is about 4 inches to about 12 inches in width.

13. The sun shade (100) of claim 1, wherein the shade member (110) is about 40 inches to about 100 inches in length.

14. A method of blocking out sun glare in an off-road vehicle (10), the off-road vehicle having a first front bar at a driver side and a second front bar at a passenger side, said method comprising:

a) providing the sun shade (100) of claim 1;

b) wrapping the first end (112) of the shade member around the first front bar;

c) fastening the at least one first fastening component (120) of the first end to one of the second fastening components (130);

d) wrapping the second end (114) of the shade member around the second front bar;

e) fastening the at least one first fastening component (120) of the second end to one of the second fastening components (130) such that the shade member (110) is sufficiently tight around the front bars and stays in place, wherein the shade member (110) blocks a portion of the viewing space between the two front bars; and f) sliding the sun shade (100) up or down the first and second bars such that the sun shade blocks sun glare.

15. The method of claim 14, wherein the off-road vehicle (10) is a utility terrain vehicle, an all-terrain vehicle, a golf cart, or a tractor.

16. The method of claim 14, wherein the two front bars are part of a roll cage.

17. The method of claim 14, wherein the two front bars are part of a canopy.

18. The method of claim 14, wherein the sun shade (100) is attached to the front bars such that the sun shade (100) does not conceal a rear-view mirror of the off-road vehicle (10).

* * * * *